(12) United States Patent
Kakani (10) Patent No.: US 7,873,018 B2
(45) Date of Patent: Jan. 18, 2011

(54) SCHEDULING DATA TRANSMISSIONS TO IMPROVE POWER EFFICIENCY IN A WIRELESS NETWORK

(75) Inventor: Naveen K. Kakani, Irving, TX (US)

(73) Assignee: Nokia Corporation, Espoo (FI)

( * ) Notice: Subject to any disclaimer, the term of this patent is extended or adjusted under 35 U.S.C. 154(b) by 628 days.

(21) Appl. No.: 11/452,082

(22) Filed: Jun. 13, 2006

(65) Prior Publication Data

US 2006/0285517 A1 Dec. 21, 2006

Related U.S. Application Data

(60) Provisional application No. 60/691,220, filed on Jun. 16, 2005.

(51) Int. Cl.
*H04W 4/00* (2009.01)
*H04B 7/158* (2006.01)

(52) U.S. Cl. .................. 370/338; 370/329; 370/318

(58) Field of Classification Search .......... 370/329, 370/280, 395.4, 347, 468, 442, 318, 328, 370/338, 7, 773, 569, 310, 336; 455/562.1
See application file for complete search history.

(56) References Cited

U.S. PATENT DOCUMENTS

| 6,226,277 | B1 | | 5/2001 | Chuah | |
|---|---|---|---|---|---|
| 6,285,665 | B1 | | 9/2001 | Chuah | |
| 6,889,056 | B2 | | 5/2005 | Shibutani | |
| 7,062,294 | B1 | * | 6/2006 | Rogard et al. | 455/562.1 |
| 7,477,621 | B1 | * | 1/2009 | Loc et al. | 370/329 |
| 7,773,569 | B2 | * | 8/2010 | Belcea | 370/338 |
| 2002/0097689 | A1 | * | 7/2002 | Eloy et al. | 370/280 |
| 2003/0026286 | A1 | * | 2/2003 | Nakamura | 370/442 |
| 2003/0174716 | A1 | | 9/2003 | Lee et al. | |

(Continued)

FOREIGN PATENT DOCUMENTS

GB 2415573 12/2005

(Continued)

OTHER PUBLICATIONS

*HT MAC Specification: Enhanced Wireless Consortium publication: MAC spec*, 24, http://www.enhancedwirelessconsortium.org/home/EWC_MAC_spec_v124.pdf, (Jan. 5, 2006).

(Continued)

*Primary Examiner*—Charles N Appiah
*Assistant Examiner*—Kiet Doan
(74) *Attorney, Agent, or Firm*—Brake Hughes Bellermann LLP (57) ABSTRACT

Various embodiments are disclosed relating to scheduling data transmissions to improve power efficiency in a wireless network. In an example embodiment, uplink transmissions may be scheduled after the downlink transmissions within the frame sequence. One or more nodes having only scheduled downlink transmissions during the frame sequence may be scheduled for downlink transmissions at or near the start of the downlink transmissions. In another embodiment, one or more nodes having only scheduled uplink transmissions during the frame sequence may be scheduled for uplink transmissions at or near the end of the uplink transmissions. In yet another embodiment, one or more nodes having scheduled both downlink and uplink transmissions during the frame sequence may be scheduled for transmissions near a transition from downlink to uplink transmissions.

18 Claims, 7 Drawing Sheets

U.S. PATENT DOCUMENTS

| | | | |
|---|---|---|---|
| 2004/0017825 A1* | 1/2004 | Stanwood et al. | 370/468 |
| 2004/0190482 A1* | 9/2004 | Baum et al. | 370/347 |
| 2005/0018624 A1* | 1/2005 | Meier et al. | 370/318 |
| 2005/0220116 A1* | 10/2005 | Ahn et al. | 370/395.4 |

FOREIGN PATENT DOCUMENTS

| | | |
|---|---|---|
| JP | 2000-253448 A | 9/2000 |
| JP | 2005-057684 A | 3/2005 |
| TW | 200515732 | 5/2005 |
| WO | 2004/088886 A2 | 10/2004 |
| WO | WO-2004107605 A1 | 12/2004 |
| WO | 06134472 A3 | 12/2006 |
| WO | WO-2006134472 A2 | 12/2006 |

OTHER PUBLICATIONS

*International Search Report for Application # PCT/IB2006/001589,* (Dec. 12, 2006).

IEEE P802.11n™/D1.0 Draft Amendment to Standard [FOR] Information Technology-Telecommunications and information exchange between systems-Local and Metropolitan networks-Specific requirements-Part 11: Wireless LAN Medium Access Control (MAC) and Physical Layer (PHY) specifications: Enhancments for Higher Throughput (Mar. 2006).

Office Action Received for Vietnamese Patent Application No. 1-2007-02523 mailed on Feb. 26, 2008, 1 page.

International Search Report on Patentability Received for PCT patent Application No. PCT/IB2006/001589 Jan. 3, 2008, 7 pages.

Office Action Received for Taiwanese Patent Application No. 95121480 mailed on Feb. 9, 2009, 12 pages.

Office Action Received for Malaysian Patent Application No. PJ20062864 mailed on Apr. 17, 2009, 3 pages.

Japanese Office action for Japanese Patent Application No. 2008-516438, mailedd on May 27, 2010, 17 pages (Including English Translation).

* cited by examiner

610 Transmitting a frame identifying uplink and/or downlink transmission periods during a frame sequence for one or more nodes in a wireless network, the uplink transmissions being scheduled after the downlink transmissions within the frame sequence.

620 With one or more nodes having only scheduled downlink transmissions during the frame sequence being scheduled for downlink transmissions at or near the start of the downlink transmissions.

630 With one or more nodes having only scheduled uplink transmissions during the frame sequence being scheduled for uplink transmissions at or near the end of the uplink transmissions.

640 With one or more nodes having scheduled both downlink and uplink transmissions during the frame sequence being scheduled for transmissions near a transition from downlink to uplink transmissions.

SCHEDULING DATA TRANSMISSIONS TO IMPROVE POWER EFFICIENCY IN A WIRELESS NETWORK

CROSS-REFERENCE TO RELATED APPLICATIONS

This application claims priority to U.S. Provisional application Ser. No. 60/691,220, filed on Jun. 16, 2005, entitled "Scheduling and Sequencing of Data/STAs and Information for Maximal Power Efficiency in Aggregated Frames," hereby incorporated by reference.

This application is related to U.S. Provisional application Ser. No. 60/620,246, filed on Oct. 19, 2004, entitled "Scheduling and Sequencing of Data and Information for Maximal Power Efficiency in Aggregated Frames," hereby incorporated by reference.

BACKGROUND

The rapid diffusion of Wireless Local Area Network (WLAN) access and the increasing demand for WLAN coverage is driving the installation of a very large number of Access Points (AP). The most common WLAN technology is described in the Institute of Electrical and Electronics Engineers IEEE 802.11 family of industry specifications, such as specifications for IEEE 802.11b, IEEE 802.11g and IEEE 802.11a. A number of different 802.11 task groups are involved in developing specifications relating to improvements to the existing 802.11 technology.

Power consumption and battery life are issues for wireless devices. A number of power-saving techniques have been proposed to reduce power consumption and improve battery life. However, current techniques have not sufficiently addressed the issue of power consumption nor sufficiently reduced the number of on/off transitions to low power state for wireless devices.

SUMMARY

Various embodiments are disclosed relating to scheduling of data transmissions for power save delivery in a wireless network.

According to an example embodiment, a method is provided. The method may include transmitting a frame including a schedule identifying uplink and/or downlink transmission periods during a frame sequence for one or more nodes in a wireless network. The uplink transmissions may be scheduled after the downlink transmissions within the frame sequence, with one or more nodes having only scheduled downlink transmissions during the frame sequence being scheduled for downlink transmissions at or near the start of the downlink transmissions. In an example embodiment, the transmitted frame may be a Power Save Multi Poll (PSMP) message, for example, and the frame sequence may be, for example, a PSMP sequence. In yet another example embodiment, the transmitted frame may be, for example, an IEEE 802.11n Power Save Multi Poll (PSMP) message.

In another example embodiment, a method is provided. The method may include transmitting a frame including a schedule identifying uplink and/or downlink transmission periods during a frame sequence for one or more nodes in a wireless network. The uplink transmissions may be scheduled after the downlink transmissions within the frame sequence. One or more nodes having only scheduled uplink transmissions during the frame sequence may be scheduled for uplink transmissions at or near the end of the uplink transmissions.

In yet another embodiment, a method is provided. The method may include transmitting a frame including a schedule identifying uplink and/or downlink transmission periods during a frame sequence for one or more nodes in a wireless network. The uplink transmissions may be scheduled after the downlink transmissions within the frame sequence. One or more nodes having both scheduled downlink and uplink transmissions during the frame sequence may be scheduled for transmissions near a transition from downlink to uplink transmissions.

In yet another embodiment, a method is provided. The method may include transmitting a frame identifying uplink and/or downlink transmission periods during a frame sequence for one or more nodes in a wireless network. The uplink transmissions may be scheduled after the downlink transmissions within the frame sequence. One or more nodes having only scheduled downlink transmissions during the frame sequence may be scheduled for downlink transmissions at or near the start of the downlink transmissions. One or more nodes having only scheduled uplink transmissions during the frame sequence may be scheduled for uplink transmissions at or near the end of the uplink transmissions. One or more nodes having scheduled both downlink and uplink transmissions during the frame sequence may be scheduled for transmissions near a transition from downlink to uplink transmissions.

In another embodiment, an apparatus may be provided. The apparatus may include a controller, a memory coupled to the controller. The apparatus may be adapted to transmit a frame identifying uplink and/or downlink transmission periods during a frame sequence for one or more nodes in a wireless network. The uplink transmissions may be scheduled after the downlink transmissions within the frame sequence. In one embodiment, one or more nodes having only scheduled downlink transmissions during the frame sequence may be scheduled for downlink transmissions at or near the start of the downlink transmissions. In another embodiment, one or more nodes having only scheduled uplink transmissions during the frame sequence may be scheduled for uplink transmissions at or near the end of the uplink transmissions. In yet another embodiment, one or more nodes having scheduled both downlink and uplink transmissions during the frame sequence may be scheduled for transmissions near a transition from downlink to uplink transmissions.

In another embodiment, an article may be provided including a storage medium. The storage medium may include instructions stored thereon that, when executed by a processor, may result in: transmitting a frame identifying uplink and/or downlink transmission periods during a frame sequence for one or more nodes in a wireless network. The uplink transmissions may be scheduled after the downlink transmissions within the frame sequence. In one embodiment, one or more nodes having only scheduled downlink transmissions during the frame sequence may be scheduled for downlink transmissions at or near the start of the downlink transmissions. In another embodiment, one or more nodes having only scheduled uplink transmissions during the frame sequence may be scheduled for uplink transmissions at or near the end of the uplink transmissions. In yet another embodiment, one or more nodes having scheduled both downlink and uplink transmissions during the frame sequence may be scheduled for transmissions near a transition from downlink to uplink transmissions.

BRIEF DESCRIPTION OF THE DRAWINGS

The details of one or more implementations are set forth in the accompanying drawings and the description below. Other features will be apparent from the description and drawings, and from the claims.

DETAILED DESCRIPTION

Figure 1:
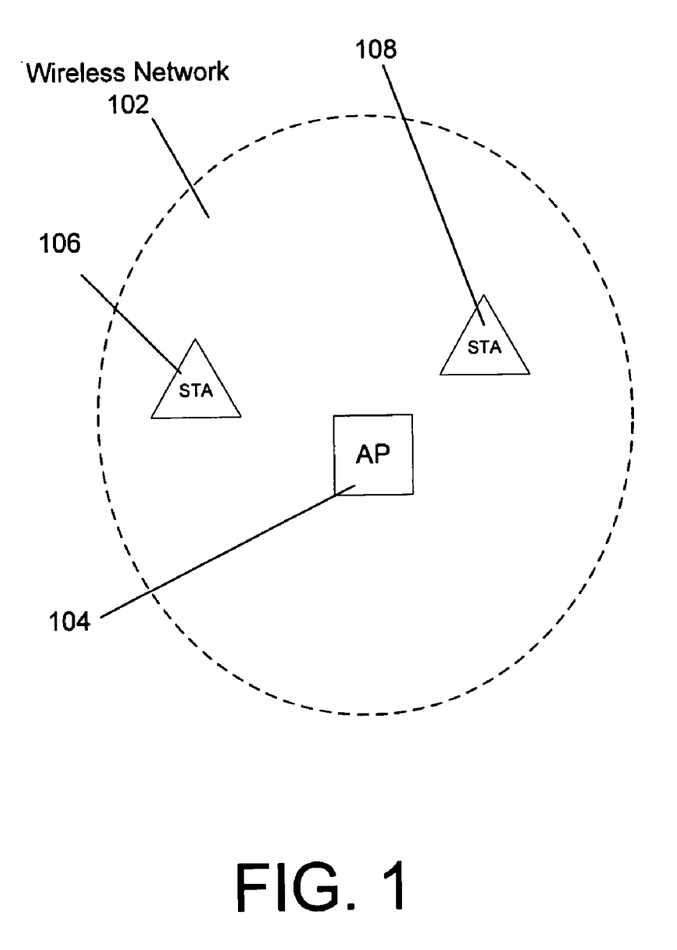
FIG. 1 is a block diagram illustrating a wireless network according to an example embodiment.

Referring to the Figures in which like numerals indicate like elements, FIG. 1 is a block diagram illustrating a wireless network according to an example embodiment. Wireless network 102 may include a number of wireless nodes or stations, such as an access point (AP) 104 or base station and one or more mobile stations, such as stations 106 and 108. While only one AP and two mobile stations are shown in wireless network 102, any number of APs and stations may be provided. Each station in network 102 (e.g., stations 106, 108) may be in wireless communication with the AP 104, and may even be in direct communication with each other. Although not shown, AP 104 may be coupled to a fixed network, such as a Local Area Network (LAN), Wide Area Network (WAN), the Internet, etc., and may also be coupled to other wireless networks.

The various embodiments described herein may be applicable to a wide variety of networks and technologies, such as WLAN networks (e.g., IEEE 802.11 type networks), IEEE 802.16 Wi MAX networks, cellular networks, radio networks, or other wireless networks. In another example embodiment, the various examples and embodiments may be applied, for example, to a mesh wireless network, where a plurality of mesh points (e.g., Access Points) may be coupled together via wired or wireless links. The various embodiments described herein may be applied to wireless networks, both in an infrastructure mode where an AP or base station may communicate with a station (e.g., communication occurs through APs), as well as an ad-hoc mode in which wireless stations may communicate directly via a peer-to-peer network, for example.

The term "wireless node" or "node," or the like, may include, for example, a wireless station, an access point (AP) or base station, a wireless personal digital assistant (PDA), a cell phone, an 802.11 WLAN phone, a wireless mesh point, or any other wireless device. These are merely a few examples of the wireless devices that may be used to implement the various embodiments described herein, and this disclosure is not limited thereto.

In an example embodiment, a wireless node (e.g., AP or station) may determine capabilities of other nodes by receiving a capabilities field in a beacon message or probe response (e.g., from an AP) and via an association request or re-association request (e.g., from a station), for example. An AP may associate with one or more wireless stations or nodes. The process of associating an AP with one more wireless stations or nodes may include the AP assigning an Association ID (AID) to each of the wireless stations or node with which it is associated.

After a station is associated with an AP, the two nodes may establish a data transmission schedule, indicating a service period, for example, by exchanging one or more frames or messages indicating a schedule start time for the service period. A variety of different mechanisms may be used to exchange or agree on a time for a service period. For example, the IEEE 802.11e draft specification allows for power management through automatic power-save delivery (APSD). APSD provides two delivery mechanisms: scheduled APSD and unscheduled APSD. Stations may use unscheduled APSD (U-APSD) to have all or some of their frames delivered to them from the AP during unscheduled service periods. An unscheduled service period may begin when the AP receives a trigger message from the station. According to scheduled APSD (S-APSD), a station may receive a data transmission schedule from an AP indicating a service start time and service interval when the station may receive and transmit frames during scheduled service periods. For example, by using APSD, a station may conserve power and extend battery life by remaining in a lower power state, and then waking during a scheduled or unscheduled service period to receive and transmit data. In an example embodiment, an AP may allocate the same service period for multiple stations or nodes, which may require each of these multiple stations to be awake during a substantial portion of (or even all of) the service period in some cases, as examples.

In an example embodiment, an AP or other node may transmit (e.g., broadcast) a frame, such as an aggregation control header frame or a Power Save Multi Poll (PSMP) frame or message, or other message. The PSMP message (or other frame) may, for example, include a data transmission schedule identifying uplink and/or downlink transmission periods during a frame sequence for one or more nodes in a wireless network. Downlink may refer to transmissions from an AP or access point or base station to stations or other nodes, while uplink may refer to transmissions from stations or other nodes to an AP or base station, for example. In an example embodiment, a PSMP sequence may include, for example, transmission of a PSMP message, followed by downlink transmission of broadcast or multicast data, followed by downlink unicast transmissions to one or more nodes, followed by uplink transmissions from one or more nodes to the AP. Other orders may be used for a frame sequence or PSMP sequence.

The PSMP frame may allow an AP or a wireless node to provide schedules or sub-schedules to each of a plurality of wireless stations or nodes. These PSMP data transmission schedules, or sub-schedules, may indicate for example a downlink start time and duration (for a scheduled transmission to a specified station), and/or an uplink start time and duration (for a scheduled transmission period where a specified station may be permitted to transmit data on the medium). The PSMP frame, which may include a DLT (downlink transmission) and/or ULT (uplink transmission) schedules, may be transmitted according to the S-APSD service period, for an U-APSD, or may be transmitted at any time (e.g., during unscheduled periods), according to example embodiments. A PSMP frame may be transmitted by any wireless node, such as by an access point (AP) or a station.

Figure 2:
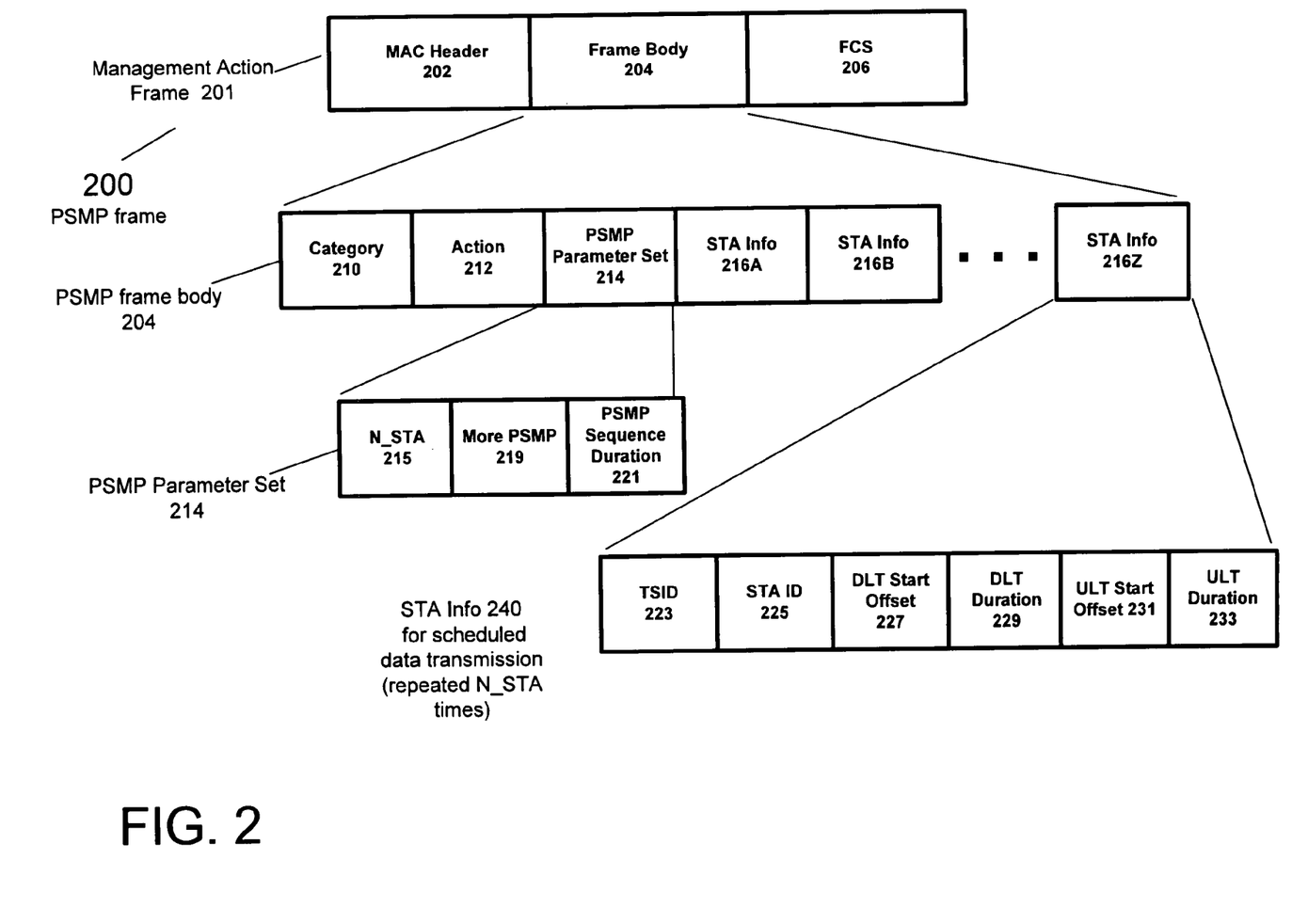
FIG. 2 is a diagram illustrating a format of a multi poll message, such as a Power Save Multi Poll (PSMP) management frame, according to an example embodiment.

FIG. 2 is a diagram illustrating a format of a multi poll message, such as an IEEE 802.1 in Power Save Multi Poll (PSMP) management frame 200, according to an example embodiment. Management action frame 201 may include a MAC header 202 that may include MAC address information and other fields, a frame body 204 and a frame check sequence (FCS) 206, for example. In an example embodiment, frame body 204 may be a Power Save Multi Poll (PSMP) frame body. The frame body 204 may include a category field 210 set to a value indicating High Throughput (HT) (e.g., HT or IEEE 802.11n related frame), for example. Frame body 204 may also include an Action field 212 set to a value indicating a PSMP frame.

Frame body 204 may also include a PSMP parameter set 214 and one or more station information fields (STA Info fields) 216. PSMP parameter set 214 may include a number of stations (N_STA) field 215 indicating a number of station information fields (STA Info fields) present in the frame body 204. Further, a More PSMP field 219 may be set to a 1, for example, to indicate that this PSMP sequence may typically be followed by another PSMP sequence. Alternatively, More PSMP 219 may be set to 0 to indicate that this is the last PSMP sequence during this service period. According to an example embodiment, a PSMP sequence may include, for example, a PSMP frame followed by a scheduled data transmission to (downlink) and/or from (uplink) one or more stations, as indicated by the PSMP frame. PSMP sequence duration field 221 indicates the duration of the current PSMP sequence which is described by the PSMP frame.

As noted above, an AP may transmit to a plurality of stations and/or receive from a plurality of stations, according to the information provided in the one or more station information (STA Info) fields 216, e.g., in accordance with the transmission schedule provided via one or more STA Info fields 216. The information provided in the one or more STA Info fields 216 may be generally referred to as a schedule or a transmission schedule. A STA Info field may be provided for each station for which uplink and/or downlink transmission is being scheduled by the PSMP message (for the current PSMP sequence). The number of STA Info fields is indicated by the N_STA field 215. Therefore, the PSMP frame body 204 illustrated in FIG. 2 may include one or more STA Info fields, such as STA Info fields 216A, 216B, ... 216Z, as an example.

Each STA Info field 216 may include a plurality of fields. The STA Info field 216 may include a traffic stream identifier (TSID) field 223, which may identify one or more TSIDs that a station may or should use for transmitting data back to the AP for a scheduled uplink data transmission, for example. A station identifier (STA ID) field 225 may identify the station (e.g., using either a portion of a MAC address of the station or the AID for the station). Although not required, in an example embodiment, the STA ID field 225 in STA Info field 216 may be set to zero to indicate a multicast transmission. In addition, STA ID field 225 may also be set to all 1s to indicate a broadcast transmission. The TSID field 223 and the STA ID field 225 may not necessarily be applicable for the scheduling of a multicast transmission (e.g., upstream TSIDs not applicable for downstream multicast transmission, and a multicast frame is typically directed to multiple receiver nodes and thus one STA ID field would typically be inadequate, for example).

The downlink transmission (DLT) start offset field 227 may indicate a start time for the scheduled downlink data transmission (from AP to station), and a downlink transmission (DLT) duration field 229 may indicate a duration for the scheduled downlink transmission. These two DLT related fields (227, 229) may be applicable for both a unicast transmission (e.g., transmission to a single receiver node) and a multicast transmission (multicast may be, for example, a downlink data transmission from the AP to multiple receiver nodes or stations).

An uplink transmission (ULT) (from station to AP) start offset field 231 and a ULT duration field 233 are provided within the STA Info field 216 to communicate a start time and duration for a scheduled uplink data transmission for a node or station.

Figure 3:
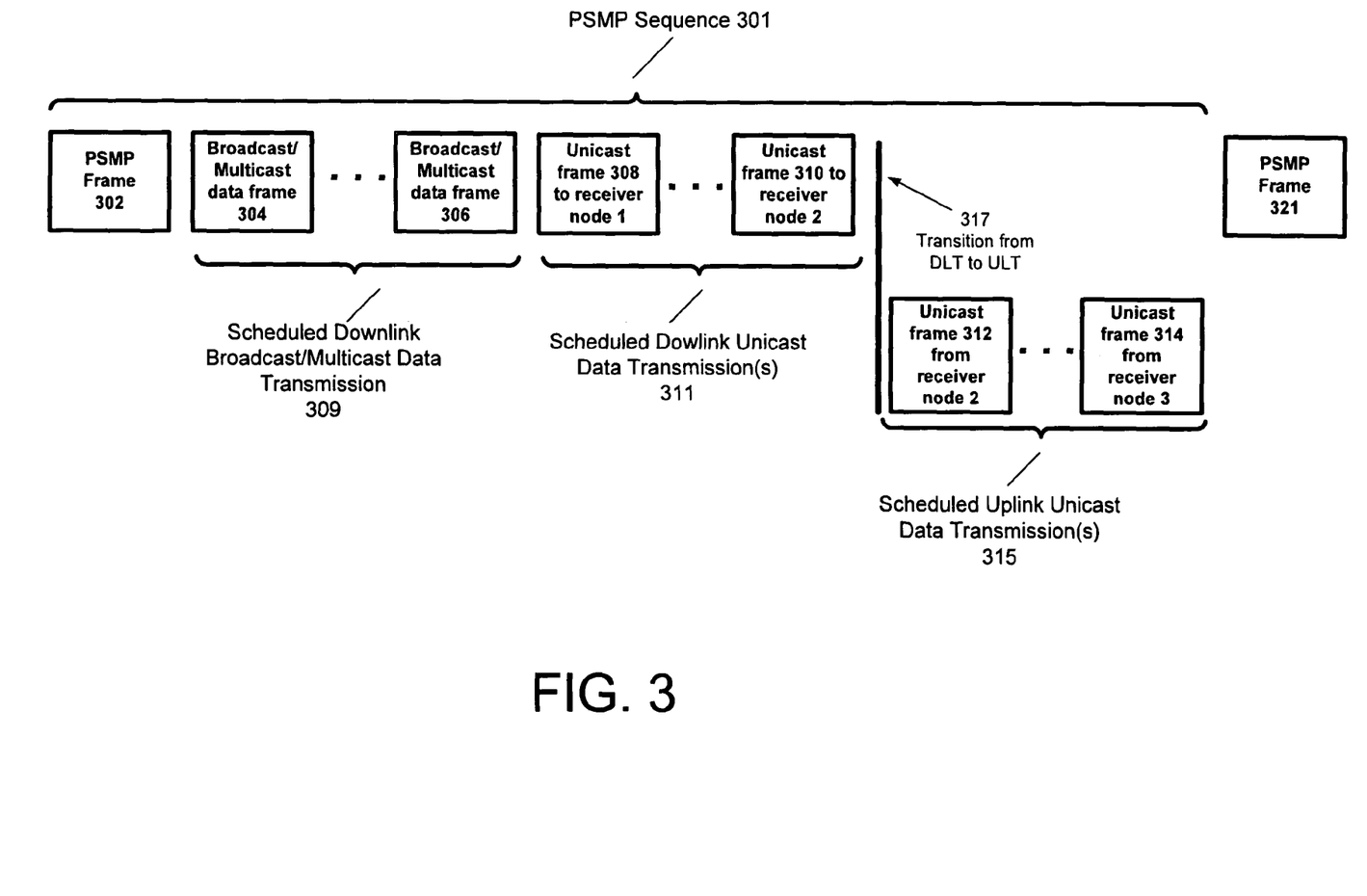
FIG. 3 is a diagram illustrating a PSMP sequence according to an example embodiment.

FIG. 3 is a diagram illustrating a PSMP sequence according to an example embodiment. In FIG. 3, a PSMP sequence 301 may include the transmission of a PSMP frame 302, followed by a scheduled downlink broadcast and/or multicast data transmission period 309 to one or more receiver nodes, a scheduled downlink unicast data transmission period 311 to one or more receiver nodes, and a scheduled uplink unicast transmission period 315 from one or more receiver nodes, for example. In an example embodiment, the uplink transmissions (315) may be scheduled after the downlink transmissions (309 and/or 311). A transition 317 is shown from downlink transmissions (DLT) (e.g., 309, 311) to uplink transmissions (ULT) 315. The transition from DLT to ULT may be a point, for example, after downlink transmissions (e.g., 309, 311) for the PSMP sequence 301 are completed, and just before the uplink transmissions (315) for the sequence 301 have begun.

In the PSMP frame 302, the TSID field 223 may indicate a traffic stream for which a receiver node may transmit frames during the scheduled uplink unicast data transmission period 315, for example. The STA ID field 225 may include the AID for the receiver node (or otherwise identify the receiver node). The DLT fields 227 and 229 may be set to values indicating a start time and duration, respectively, for the scheduled downlink unicast data transmission period 311 to the identified receiver node. Likewise, the ULT fields 231 and 233 within PSMP frame 302 may be set to values indicating the start time and duration, respectively, for the scheduled uplink unicast data transmission that is being provided to the identified receiver node (e.g., identified by STA ID).

After transmitting the PSMP frame 302, the AP may immediately or substantially immediately (e.g., without intervening frames) transmit one or more downlink frames as part of the DLTs. For example, the AP may immediately after the PSMP frame 302, may transmit one or more broadcast and/or multicast frames (304, 306, ... ) for the scheduled downlink broadcast/multicast data transmission period 309. Thus, according to an example embodiment, as a default scheduling time, the downlink broadcast and/or multicast data frames may be transmitted immediately after transmission of the PSMP frame 302, for example, so that each receiver node may know or expect the broadcast and/or multicast data transmissions at this time. In an example embodiment, broadcast data frames may be scheduled prior to multicast data frames. In another embodiment, multicast data frames may be scheduled prior to broadcast data frames. In yet another embodiment, the scheduling of broadcast data frames and multicast data frames may be interspersed with one another.

In the case of multicast transmissions, a dedicated STA Info field 216 can be used to indicate multicast transmission(s). In this case, the TSID field 223 may be set to 1 or other specific value to indicate that the receiver nodes which have scheduled uplink transmissions shall send multicast acknowledgement(s) back. In this situation, the STA ID field 225 may be set to 0. In an example embodiment, for broadcast/multicast transmissions, the DLT fields 227 and 229 may be used to communicate downlink multicast transmission period(s) or schedule and the ULT fields 231 and 233 may be set to 0 (or don't cares). However, these are merely examples, and the various embodiments are not limited thereto.

In an example embodiment, if there are no downlink broadcast/multicast frames to be transmitted from the AP for this PSMP sequence, the scheduled downlink unicast data transmissions 311 may begin after the PSMP frame, for example. Or, in another embodiment, the downlink unicast transmissions (311) may begin after the PSMP frame and broadcast/multicast downlink transmissions (309) may come after downlink unicast transmissions (311), for example.

Next, referring to FIG. 3, one or more unicast frames (e.g., frames 308, 310, 312, 314) may be transmitted to and from one or more receiver nodes (e.g. "node 1" "node 2" and "node 3") as part of the scheduled downlink unicast data transmission period 311 and the scheduled uplink unicast data transmission period 315. In the situation where the unicast frames are being transmitted to and/or from PSMP capable stations (e.g., "node 1," "node 2" and "node 3" in this embodiment), the transmission of unicast frames may be scheduled in the PSMP frame so as to reduce the number of on/off transitions for the PSMP cable capable stations during the PSMP sequence 301, and/or to increase a delay between a node's DLT and ULT periods. By scheduling DLT and ULT periods for nodes in this manner may reduce the amount of "awake time" (e.g., the amount of time operating in a full power mode) for PSMP capable stations during a given PSMP sequence. Accordingly, power consumption for PSMP capable stations may be reduced using the scheduling techniques described below, for example. In general, a DLT may be a period when a station or node may receive data, either from an AP or other station. A ULT is a period when a station may transmit data over the medium to an AP or other station.

An on/off transition may, for example, be a transition from an operating mode (e.g., full power mode) to a low power (e.g., standby/sleep mode) and vice versa. For purposes of this disclosure, an on/off transition may refer interchangeably to (i) a transition from an operating mode to a standby mode and (ii) a transition from a standby mode to an operation mode. By scheduling transmission of frames in accordance with the embodiments described herein, the number of on/off transitions for PSMP stations may be reduced. Likewise, the amount of time such PSMP stations are in low power (e.g., standby mode) may be increased by scheduling transmission of unicast frames in accordance with the embodiments described herein.

In the example embodiment illustrated in FIG. 3, three PSMP stations (node 1, node 2 and node 3) have unicast frames scheduled for transmission during PSMP sequence 301. For instance, in this example, node 1 only has only a scheduled transmission of downlink unicast frame 308, while node 3 only has a scheduled transmission of only uplink unicast frame 314. Node 2, in comparison, has a scheduled transmission of downlink unicast frame 310 and uplink unicast frame 312 scheduled. This is merely an illustrative or example embodiment. Other embodiments exist where additional nodes or fewer nodes are scheduled for data transmissions or additional frames may be transmitted. Further, it will be appreciated that the types of data scheduled for transmission to and/or from a given node and the schedules for those transmissions may vary from PSMP sequence to PSMP sequence.

According to an example embodiment, for one or more nodes having only scheduled downlink transmissions during a PSMP sequence, these nodes may be scheduled for downlink transmissions at or near the start of the downlink transmissions 311. For example, as is shown in FIG. 3, transmission of downlink unicast frame 308 for node 1 is scheduled at or near the beginning of the downlink unicast data transmission period 311. Although not required, the downlink transmission may be scheduled substantially immediately after the PSMP frame 302 or after the broadcast/multicast transmissions 309. In this situation, node 1 may enter a low power state for the remainder of the PSMP sequence 301 after unicast frame 308 has been received. In an example embodiment, node 1 may be operating in a full power mode (awake) during broadcast/multicast data transmission period 309, receive its downlink transmissions (e.g., frame 308), and then enter low power state.

By scheduling transmission of unicast frame 308 at or near the beginning of downlink unicast transmission period 311, the number of on/off transitions as well as the amount of time node 1 spends awake may be reduced. For instance, delaying the downlink transmission of frame 308 for node 1 until the middle or end of DLT 311 may typically increase the period of time that node 1 is operating in full power mode, thereby typically increasing power consumption for node 1. Alternatively node 1 may go through an additional on/off transition, for example, going into standby mode after broadcast/multicast data transmission period 309 and returning to an awake (full power) mode at or just prior to the scheduled downlink unicast transmission of unicast frame 308. However, such an approach may, for example, be less power-efficient in some cases than scheduling the DLT (e.g., frame 308) for node 1 at or near the beginning of the downlink transmissions 311.

According to another example embodiment, for one or more nodes having only scheduled uplink transmissions during a PSMP sequence, these nodes may be scheduled for uplink transmissions at or near the end of the uplink transmissions 315. For example, node 3 is scheduled only for uplink data transmissions (e.g., frame 314). Therefore, transmission of uplink unicast frame 314 for node 3 may be scheduled at or near the end of the uplink unicast data transmission period 315. In this situation, node 3 may enter a low power state after the broadcast/multicast data transmission period 309 and remain in the low power state during the unicast data transmission periods 311, until returning to full-power mode at or just prior to the scheduled uplink unicast transmission of unicast frame 314. Node 3 may then transmit frame 314, and then return to low power state until it is time to receive the next PSMP frame, for example. In another example embodiment, node 3 may enter the low power state after receiving PSMP frame 302 if there is no data scheduled to be transmitted to node 3 during the broadcast/multicast data transmission period 309 of PSMP sequence 301, or if there are no broadcast or multicast frames to be transmitted.

By scheduling transmission of unicast frame 314 (for node 3, scheduled only for uplink transmissions) at or near the end of uplink unicast transmission period 315, the number of on/off transitions as well as the amount of time node 3 spends awake (or in full power mode) may be reduced, at least in some cases. For instance, if node 3 were scheduled for uplink transmissions at the beginning of uplink transmissions 315, this may reduce the amount of time that node 3 spends in a low power state. Also, if the time between on/off transitions is sufficient enough for a node to transition to a lower power STA than standby (or low power) state and back to active state (before it needs to be awake), then a node can transition to a lower power or deep sleep state and save additional power.

In an example embodiment, node 3 may go through multiple additional on/off transitions, for example, going into standby mode after broadcast/multicast data transmission period 309 and returning to an awake (full power) mode at or just prior to the scheduled uplink unicast transmission of unicast frame 314 and then returning to low power mode after sending unicast frame 314. Node 3 would then go through another on/off transition at or just prior to the transmission of a next PSMP frame 321. Using the approach illustrated in FIG. 3, because node 3 transmits the unicast packet 314 at or near the end of uplink transmission period 315, it may remain awake to receive the next PSMP frame 321, thus reducing the number of on/off transitions. This is another example embodiment.

In yet another example embodiment, for nodes scheduled for both (e.g., unicast) downlink and uplink transmissions during a PSMP sequence, these nodes may be scheduled for transmissions near or around a transition 317 from downlink transmissions to uplink transmissions. For example, as shown in FIG. 3, node 2 is scheduled for both unicast downlink transmissions and uplink transmissions during PSMP sequence 301. Therefore, the transmission of downlink unicast frame 310 and transmission of uplink unicast frame 312 for node 2 may be scheduled at or near (or around) the transition between downlink unicast data transmission period 311 and uplink unicast data transmission period 315. In this situation, node 2 may, for example, enter a low power state after the broadcast/multicast data transmission period 309 (or after receiving the PSMP frame 302 if no broadcast or multicast data transmissions are scheduled) and remain in the low power state during most of the unicast down link data transmission period 311 until returning to an awake (full power) mode at or just prior to the scheduled downlink unicast transmission of unicast frame 310 at or near the end of downlink unicast transmission period 311. Node 2 may then remain awake and transmit uplink unicast frame 312 at or near the beginning of uplink unicast data transmission period 315.

By scheduling the transmission of downlink unicast frame 310 at or near the end of downlink unicast transmission period 311 and scheduling the transmission of uplink unicast frame 312 at or near the beginning of uplink unicast transmission period 315, the number of on/off transitions as well as the amount of time node 2 spends awake may be reduced, at least in some cases. For instance, were the transmission of downlink unicast packet 310 scheduled at the middle or near the beginning of the downlink unicast data transmission period 311 and the transmission of uplink unicast packet 312 scheduled at the middle or near the end of the uplink unicast data transmissions, node 2 may remain on for a longer period of time (e.g., before and/or after the scheduled transmissions) during part of which it may be idle (e.g., not transmitting or receiving data).

Alternatively, in the above situation, node 2 may go through multiple additional on/off transitions, for example, going into standby mode after broadcast/multicast data transmission period 309 (or after receiving PSMP frame 302) and returning to an awake (full power mode) at or just prior to the scheduled downlink unicast transmission of unicast frame 310. Node 2 may then return to low power mode after receiving unicast frame 310 and then return to the awake (full power) mode at or just prior to the scheduled uplink unicast transmission of unicast frame 312. Further, node 2 may return to low power mode after transmitting unicast frame 314. Node 2, in this situation, may go through yet another on/off transition at or just prior to the transmission of a next PSMP frame 321. Using the approach illustrated in FIG. 3, because node 3 receives the unicast packet 310 and transmits the unicast packet 312 at or near the transition between downlink transmission period 311 and uplink transmission period 315, node 2 may simply remain awake after receiving unicast packet 310 to transmit unicast packet 312, thus reducing the number of on/off transitions.

Figure 4:
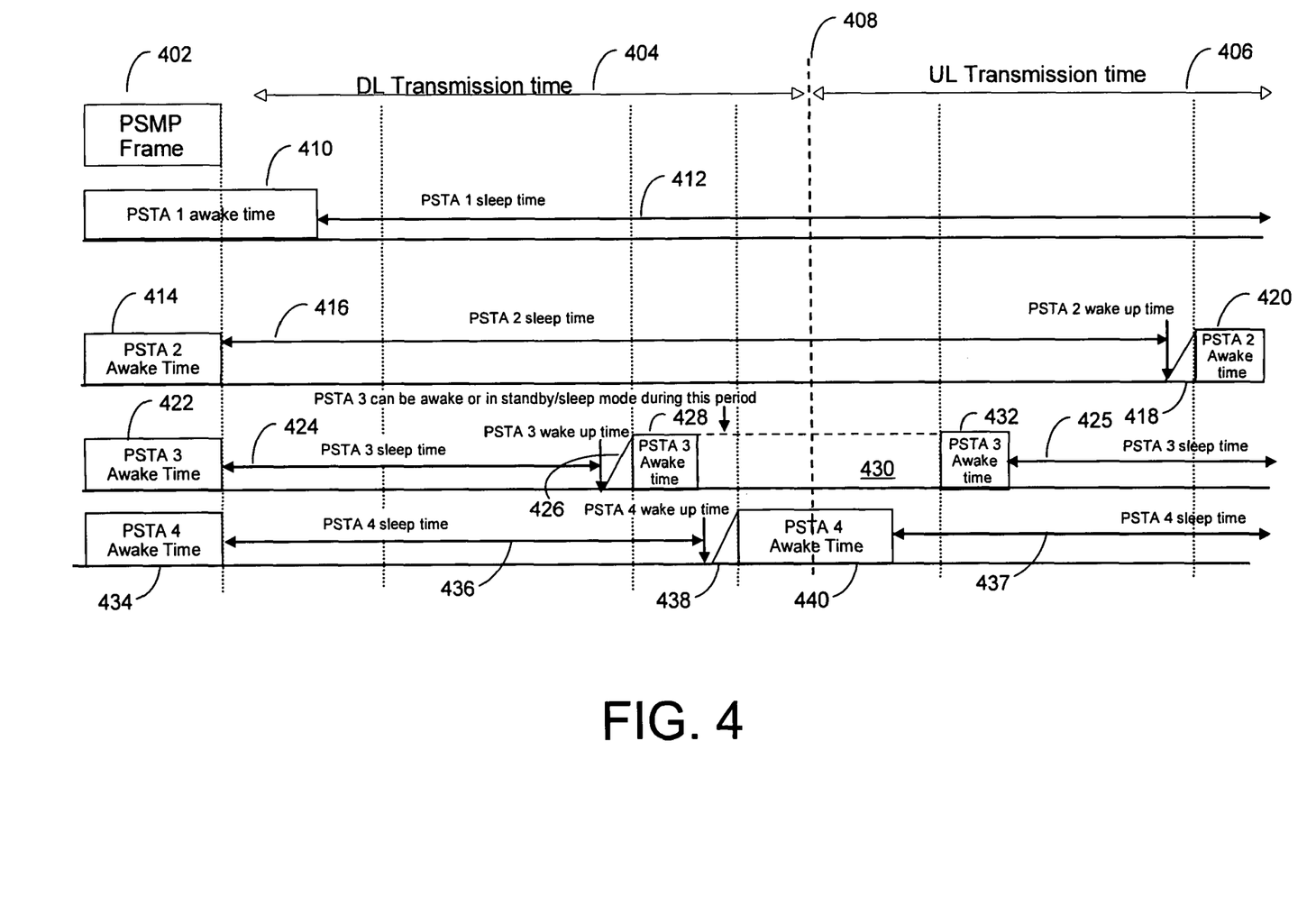
FIG. 4 is a timing diagram illustrating a data transmission schedule according to an example embodiment.

FIG. 4 is a timing diagram that illustrates an example embodiment of a data transmission schedule for a downlink transmission time period (DLT) 404 and an uplink transmission time period (ULT) 406 for an example PSMP sequence. The data transmission schedule illustrated FIG. 4 may be included in a frame (e.g., management frame), such as a PSMP frame 402. A transition point 408 in FIG. 4 designates the transition between DLT 404 and ULT 406 for the example data transmission schedule. For the schedule shown in FIG. 4, scheduling of broadcast and/or multicast data is not illustrated. It will be appreciated, however, that such a schedule may include scheduling of broadcast and/or multicast in a similar fashion as described above with respect to FIG. 3.

The data transmission schedule illustrated in FIG. 4 is similar to the PSMP sequence 301 illustrated in FIG. 3. In comparison, the data transmission schedule in FIG. 4 includes an additional node for which data transmission periods (downlink and uplink) are scheduled during both DLT 404 and ULT 404, as was the case with node 2 in FIG. 3. Accordingly, the data transmission schedule of FIG. 4 illustrates a data transmission schedule for four PSMP capable stations, PSTA 1, PSTA 2, PSTA 3 and PSTA 4. As was noted above, such a data transmission schedule may also include scheduling of data transmissions for non-PSMP stations. However, for the sake of clarity, scheduling of data transmissions for non-PSMP stations is not shown.

For the PSMP sequence of FIG. 4, PSTA 1 has only downlink unicast data transmissions scheduled during DLT 404, PSTA 2 has only uplink unicast data transmissions scheduled during ULT 406, and PSTAs 3 and 4 have both downlink and uplink unicast data transmissions scheduled (during DLT 404 and ULT 406). As illustrated in FIG. 4, PSTAs 1-4 may all be awake during the time period when PSMP frame 402 is being communicated. After receiving the PSMP frame 402, the PSTAs 1-4 may then operate in accordance with the data transmission schedule illustrated in FIG. 4, which may be included in the PSMP frame 402. The data transmission schedule for each PSTA will be described in turn.

As noted above, PSTA 1 only has downlink unicast data transmission(s) scheduled during the PSMP sequence illustrated in FIG. 4. The downlink unicast data transmission(s) for PSTA 1 are scheduled at or near the beginning of DLT 404. Accordingly, PSTA 1, during a time period 410, remains awake after receiving the PSMP frame 402 to receive the scheduled downlink transmission(s). Once the downlink transmissions for PSTA 1 are complete at the end of time period 410, PSTA 1 may enter standby (sleep) mode for the time period 412, which may include the remainder of the illustrated PSMP sequence. As discussed above, such an approach may reduce the number of on/off transitions for PSTA 1 and also may increase the amount of time PSTA 1 spends in standby. This can allow a PSTA to transition to a lower power consuming state than standby (e.g., deep sleep) and transition back to active state before the node needs to be awake. This provides additional power savings to the PSTA.

In FIG. 4, as discussed above, PSTA 2 only has uplink unicast data transmission(s) scheduled during the PSMP sequence illustrated in FIG. 4. The uplink unicast data transmission(s) for PSTA 1 are scheduled at or near the end of ULT 406. Accordingly, PSTA 2, after a time period 414 during which PSTA 2 receives PSMP frame 402, enters standby mode and remains until just before its scheduled uplink unicast data transmission(s). For instance, during a time period 418, PSTA 2 wakes up (e.g., transitions from standby to full power mode). PSTA 2 then completes its scheduled uplink unicast data transmissions during a time period 420. Once the uplink transmissions for PSTA 2 are complete at the end of time period 420, PSTA 2 may remain awake to receive a next PSMP frame. Alternatively, PSTA 2 may enter standby (sleep) mode if further PSMP sequences do not occur. As discussed above, such an approach may reduce the number of on/off transitions for PSTA 2 and also may increase the amount of time PSTA 2 spends in standby.

Further in FIG. 4, as noted above, PSTAs 3 and 4 both have downlink unicast data transmission periods and uplink unicast data transmission periods scheduled during DLT 404 and ULT 406. As shown in FIG. 4, the downlink unicast data transmission(s) for PSTAs 3 and 4 may be scheduled at or near the end of DLT 404 (e.g., just before transition point 408) while the uplink unicast data transmission(s) may be scheduled at or near the beginning of ULT 406 (e.g., just after transition point 408).

PSTA 3 in FIG. 4, after a time period 422 during which PSTA 3 receives PSMP frame 402, may enter standby mode and remain in standby mode during a time period 424 until just before its scheduled downlink unicast data transmission period. For instance, during a time period 426, PSTA 3 wakes up (e.g., transitions from standby to full power mode). PSTA 3 then completes its scheduled downlink unicast data transmission(s) during a time period 428. The uplink transmission(s) period for PSTA 3 is discussed below.

In like fashion as PSTA 3, PSTA 4 in FIG. 4 receives the PSMP frame 402 during a time period 434. Once PSTA 4 receives the PSMP from 402, it may enter standby mode and remain in standby mode during a time period 436 until just before its scheduled downlink unicast data transmission period. For instance, during a time period 438, PSTA 4 wakes up (e.g., transitions from standby to full power mode). PSTA 4 then completes its scheduled downlink unicast data transmission(s) during a time period 440.

As shown in FIG. 4, transition point 408 occurs during time period 440. Accordingly, PSTA 4 may remain awake after completing its scheduled downlink unicast transmission(s) and also complete its scheduled up link transmission(s) during the time period 440. Once the uplink transmissions for PSTA 4 are complete at the end of time period 440, PSTA 4 may enter standby (sleep) mode for the time period 437, which may include the remainder of the illustrated PSMP sequence.

For the example embodiment shown in FIG. 4, PSTA 3 completes its uplink transmission(s) during a time period 432. Time period 432 occurs substantially immediately after time period 440, during which PSTA 4 may complete its uplink and downlink unicast transmissions. Such an arrangement allows for scheduling of data transmissions for PSTAs that have both scheduled downlink and uplink unicast data transmission periods during a given PSMP sequence. PSTA 3 may remain active during a time period 430 (between its scheduled downlink transmission time period 428 and its scheduled uplink unicast data transmission time period 432. Alternatively, PSTA 3 may enter standby (sleep) mode during time period 430. Once the uplink transmissions for PSTA 3 are complete at the end of time period 432, PSTA 3 may enter standby (sleep) mode for the time period 425, which may include the remainder of the illustrated PSMP sequence. Using the approach shown in FIG. 4 (e.g., scheduling downlink and uplink unicast data transmissions periods for PSTAs which have both downlink and uplink unicast data transmissions in a given PSMP sequence so that the time periods bridge transition point 408) may reduce the number of on/off transitions for such PSTAs, as well as increase the amount of time such PSTAs spend in standby (sleep) mode.

Figure 5:
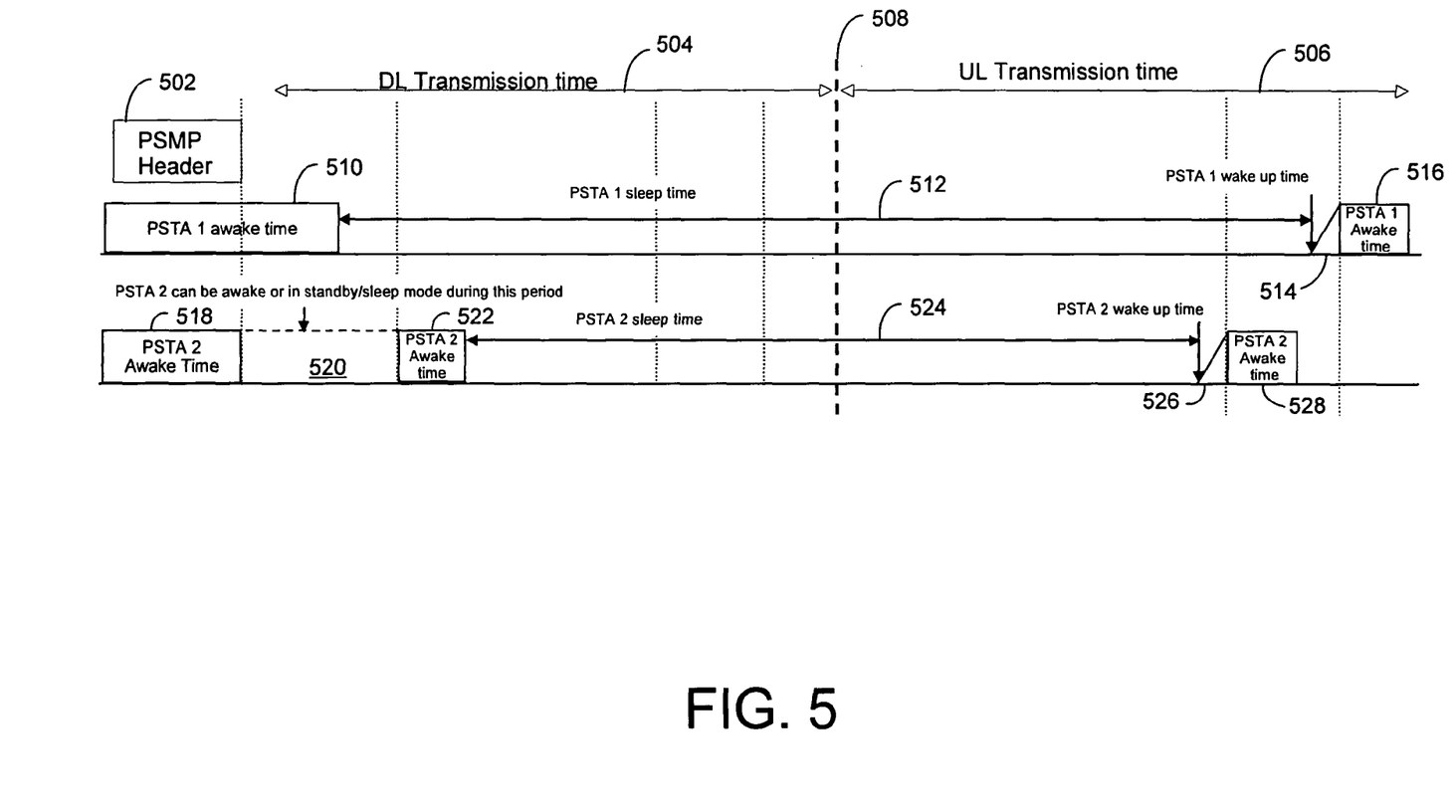
FIG. 5 is a timing diagram illustrating a data transmission schedule according to another example embodiment.

FIG. 5 is a timing diagram that illustrates an alternative example embodiment of a data transmission schedule for scheduling downlink and uplink unicast data transmissions periods for PSTAs which have both downlink and uplink unicast data transmissions in a given PSMP sequence. In similar fashion as the data transmission schedule of FIG. 4, the schedule of FIG. 5 includes a downlink transmission time period (DLT) 504 and an uplink transmission time period (ULT) 506 for an example PSMP sequence. The schedule of FIG. 5 may be included in a frame (e.g., management frame), such as a PSMP frame 502. As with FIG. 4, a transition point 508 in FIG. 5 designates the transition between DLT 504 and ULT 506 for the example data transmission schedule. Also for the schedule shown in FIG. 5, scheduling of broadcast and/or multicast data is not illustrated. It will be appreciated, however, that such a schedule may include scheduling of broadcast and/or multicast in a similar fashion as described above with respect to FIG. 3.

FIG. 5 illustrates a data transmission schedule for two PSMP capable stations, PSTA 1 and PSTA 2, which, as noted above, both have scheduled downlink and uplink unicast data transmission periods for the particular PSMP sequence illustrated. Each PSTA in FIG. 5 will be discussed in turn. In an example embodiment illustrated in FIG. 5, nodes or stations that may be scheduled for both downlink and uplink transmissions may be scheduled for downlink transmissions at or near the beginning of the downlink transmission (DLT) period 504, and may be scheduled for uplink transmissions at or near the end of the uplink transmission (ULT) period 506. In this manner, the number of on/off transitions may be decreased and the period of time a stations or node operates in full power mode may be decreased.

PSTA 1 in FIG. 5 may be awake (operating in a full power mode) during a time period 510. During time period 510, PSTA 1 may receive PSMP header 502. Also during time period 510 (e.g., substantially immediately after receiving the PSMP header 502), PSTA 1 make receive its scheduled downlink unicast data transmission. After completing the scheduled downlink unicast data transmission, PSTA 1 may enter standby mode until just before its scheduled uplink unicast data transmission time period 516. For instance, during a time period 514, PSTA 1 wakes up (e.g., transitions from standby to full power mode). PSTA 1 then completes its scheduled uplink unicast data transmission(s) during time period 516. Once the uplink unicast transmissions for PSTA 1 are complete at the end of time period 516, PSTA 1 may remain awake to receive a next PSMP frame. Alternatively, PSTA 1 may enter standby (sleep) mode if further PSMP sequences do not occur.

In like fashion as PSTA 1 in FIG. 5, PSTA 2 in FIG. 5 may be awake (operating in a full power mode) during a time period 518. During time period 518, PSTA 2 may receive PSMP header 502. PSTA 2 may then enter standby mode during a time period 520 (which may correspond with the remainder of time period 510) while PSTA 1 of FIG. 5 is completing its scheduled downlink unicast data transmission. Alternatively, PSTA 2 in FIG. 5 may remain awake during time period 520 and wake just before its scheduled downlink unicast data transmission time period 522. After completing its scheduled downlink unicast data transmission, PSTA 2 may enter standby mode until just before its scheduled uplink unicast data transmission time period 528. For instance, during a time period 526, PSTA 2 wakes up (e.g., transitions from standby to full power mode). PSTA 2 then completes its scheduled uplink unicast data transmission(s) during time period 528. Once the uplink unicast transmissions for PSTA 2 are complete at the end of time period 528, PSTA 2 may remain awake to receive a next PSMP frame (not shown in FIG. 5). Alternatively, PSTA 2 may enter standby (sleep) mode until the end of the PSMP sequence illustrated in FIG. 5.

Figure 6:
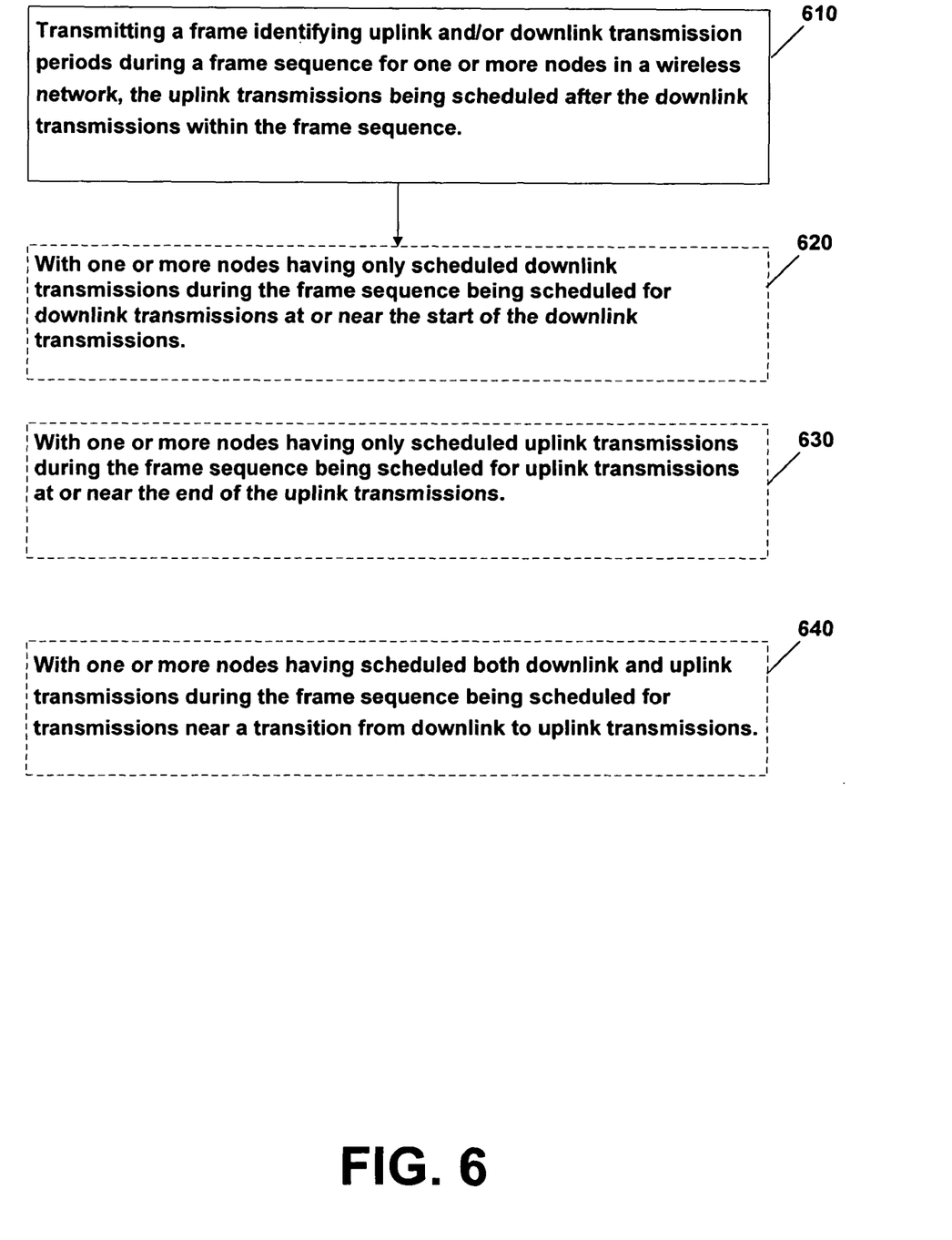
FIG. 6 is a flow chart illustrating operation of a wireless node according to an example embodiment.

FIG. 6 is a flow chart illustrating operation of a wireless node according to an example embodiment. At 610, the node, such as a base station or AP (as examples), may transmit a frame identifying uplink and/or downlink transmission periods during a frame sequence for one or more nodes in a wireless network. The uplink transmissions may be scheduled after the downlink transmissions within the frame sequence. The flow chart of FIG. 6 may include one additional operations 620, 630 and/or 640.

At 620, one or more nodes having only scheduled downlink transmissions during the frame sequence may be scheduled for downlink transmissions at or near the start of the downlink transmissions. At 630, one or more nodes having only scheduled uplink transmissions during the frame sequence may be scheduled for uplink transmissions at or near the end of the uplink transmissions. At 640, one or more nodes having scheduled both downlink and uplink transmissions during the frame sequence may be scheduled for transmissions near a transition from downlink to uplink transmissions. Data frames may then be transmitted according to the data transmission schedule included in the PSMP frame, e.g., downlink transmission, followed by uplink transmissions, according to the schedule.

Figure 7:
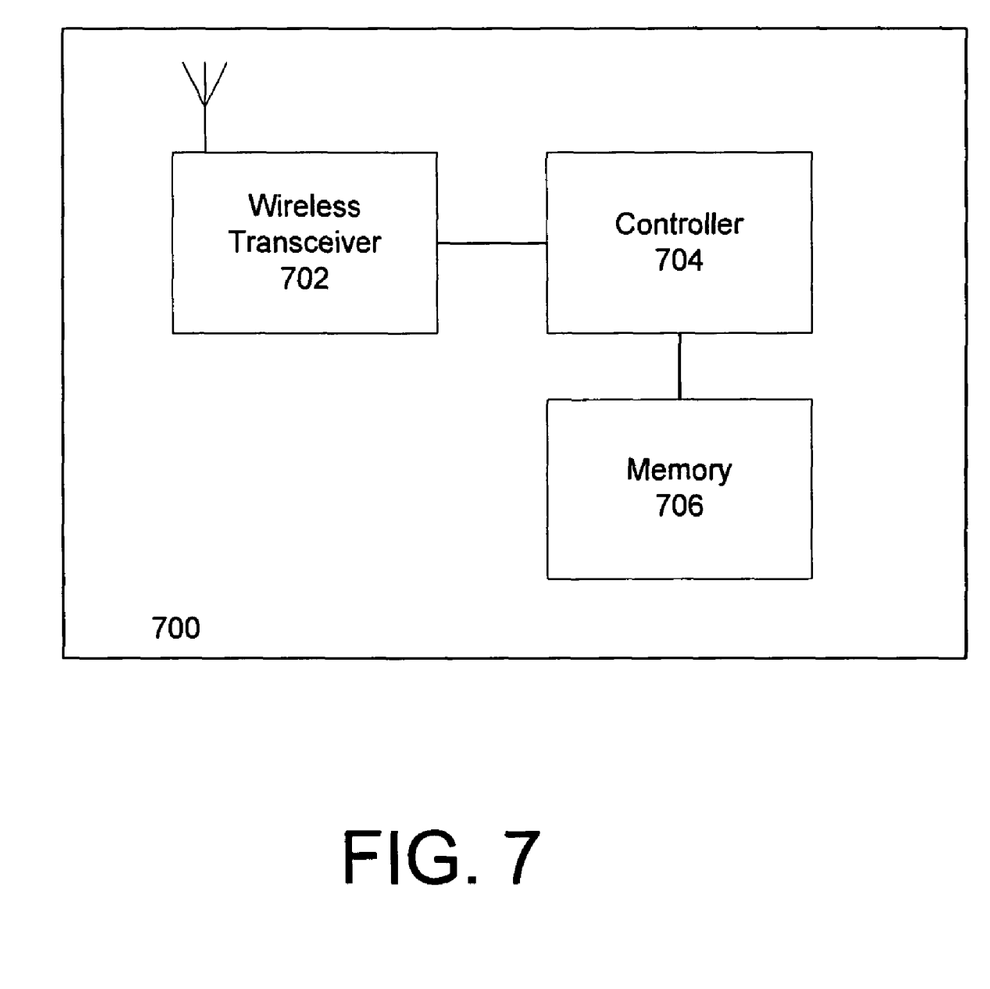
FIG. 7 is a block diagram illustrating an apparatus that may be provided in a wireless node according to an example embodiment.

FIG. 7 is a block diagram illustrating an apparatus 700 that may be provided for wireless communications, e.g., in a wireless node according to an example embodiment. The wireless node (e.g. station or AP) may include, for example, a wireless transceiver 702 to transmit and receive signals, a controller 704 to control operation of the station and execute instructions or software, and a memory 706 to store data and/or instructions.

When a wireless node receives a management frame such as, for example, the PSMP frame illustrated in FIG. 2, the node may determine whether it is to receive unicast traffic, multicast and/or broadcast traffic based on the schedules determined by the PSMP frame 200. Such schedules may be implemented, for example, in accordance with the embodiments described above. If a determination is made that no traffic is destined to be sent to or from the wireless station, the wireless station can conserve power and enter a low power state for a current frame sequence after receiving, for example, such a PSMP header.

Controller 704 may be programmable and capable of executing software or other instructions stored in memory or on other computer media to perform the various tasks and functions described above. For example, controller 704 may be programmed to transmit a management frame, such as a PSMP frame, to identify a scheduled data transmission time(s) and direction(s) for each of one or more receiver nodes in a wireless network.

In an example embodiment, controller 704 or apparatus 700 may transmit a frame identifying uplink and/or downlink transmission periods during a frame sequence for one or more nodes in a wireless network. The uplink transmissions may be scheduled after the downlink transmissions within the frame sequence. In one embodiment, one or more nodes having only scheduled downlink transmissions during the frame sequence may be scheduled for downlink transmissions at or near the start of the downlink transmissions. In another embodiment, one or more nodes having only scheduled uplink transmissions during the frame sequence may be scheduled for uplink transmissions at or near the end of the uplink transmissions. In yet another embodiment, one or more nodes having scheduled both downlink and uplink transmissions during the frame sequence may be scheduled for transmissions near a transition from downlink to uplink transmissions.

In addition, a storage medium may be provided that includes stored instructions, when executed by a controller or processor that may result in the controller 704, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:

transmitting, by an apparatus to at least a first node, a second node, and a third node, a frame including a schedule identifying uplink and downlink transmission periods, at least one downlink start time and duration for the first node, and at least one uplink start time and duration for the second node, during a frame sequence for at least the first node and the second node in a wireless network, all of the uplink transmissions being scheduled after all of the downlink transmissions within the frame sequence, with the first node having only scheduled downlink transmissions during the frame sequence having its downlink start time for downlink transmissions scheduled at or near a start of the downlink transmissions;

wherein:

the scheduled uplink transmissions for the second node having only scheduled uplink transmissions are scheduled at or near an end of the uplink transmissions, the third node having both downlink and uplink transmissions has its uplink start time and downlink start time scheduled for transmissions near a transition from downlink to uplink transmissions, and the frame comprises an IEEE 802.11n Power Save Multi Poll frame.

2. The method of claim 1 wherein the first node having only scheduled downlink transmissions during the frame sequence has its downlink start time for a downlink transmission scheduled immediately after receipt of the frame.

3. The method of claim 1 wherein the second node having only scheduled uplink transmissions during the frame sequence has its uplink start time scheduled for an uplink transmission at the end of the uplink transmissions.

4. The method of claim 1 and further comprising:
transmitting one or more downlink data frames to at least the first node at the scheduled transmission periods.

5. The method of claim 1, wherein the frame includes the schedule identifying uplink and downlink transmission periods, the first node entering a low power state for a remainder of the frame sequence after the duration for the first node.

6. The method of claim 1, further comprising:
transmitting a downlink unicast frame to the first node at the downlink start time; and
receiving an uplink unicast from the second node at the uplink start time.

7. The method of claim 1, further comprising:
transmitting a first downlink unicast frame to the first node at the first node downlink start time;
transmitting a second downlink unicast frame to the second node at the second node downlink start time;
receiving a first uplink unicast from the second node at the second node uplink start time; and
receiving an second uplink unicast from the third node at the third node uplink start time.

8. A method comprising:
transmitting, by an apparatus to at least a first node, a second node, and a third node, a frame including a schedule identifying uplink and downlink transmission periods, at least one downlink start time and duration for the first node, at least one downlink start time and duration for the second node, at least one uplink start time and duration for the second node, and at least one uplink start and duration for the third node, during a frame sequence for at least the first node, the second node, and the third node in a wireless network, all of the uplink transmissions being scheduled after all of the downlink transmissions within the frame sequence, with the second node having scheduled both downlink and uplink transmissions during the frame sequence having its downlink start time and uplink start time for transmissions scheduled near a transition from downlink to uplink transmissions,
wherein:
the scheduled downlink transmissions for the first node are scheduled at or near a start of the downlink transmissions,
the scheduled uplink transmissions for the third node are scheduled at or near an end of the uplink transmissions, and
the frame comprises an IEEE 802.11n Power Save Multi Poll frame.

9. A method comprising:
transmitting, by an apparatus to at least a first node, a second node, and a third node, a frame including a schedule identifying uplink and downlink transmission periods, at least one downlink start time and duration for the first node, and at least one uplink start time and duration for the second node, during a frame sequence for at least the first node and the second node in a wireless network, all of the uplink transmissions being scheduled after all of the downlink transmissions within the frame sequence, with the second node having only scheduled uplink transmissions during the frame sequence having its uplink transmissions scheduled at or near an end of the uplink transmissions,
wherein:
the scheduled downlink transmissions for the first node having only scheduled downlink transmissions are scheduled at or near a start of the downlink transmissions,
the third node having both downlink and uplink transmissions has its uplink start time and downlink start time scheduled for transmissions near a transition from downlink to uplink transmissions, and
the frame comprises an IEEE 802.11n Power Save Multi Poll frame.

10. A method comprising:
transmitting, by an apparatus to at least a first node, a second node, and a third node, a frame identifying uplink and downlink transmission periods, at least one downlink start time and duration for the first node, at least one downlink start time and duration for the second node, at least one uplink start time and duration for the second node, and at least one uplink start and duration for the third node, during a frame sequence for at least the first node, the second node, and the third node in a wireless network, all of the uplink transmissions being scheduled after all of the downlink transmissions within the frame sequence, with the first node having only scheduled downlink transmissions during the frame sequence having its downlink start time for downlink transmissions scheduled at or near a start of the downlink transmissions, and with the third node having only scheduled uplink transmissions during the frame sequence having its uplink start time for uplink transmissions scheduled at or near an end of the uplink transmissions, and with the second node having scheduled both downlink and uplink transmissions during the frame sequence having its downlink start time and its uplink start time for transmissions scheduled near a transition from downlink to uplink transmissions,
wherein the frame comprises an IEEE 802.11n Power Save Multi Poll frame.

11. The method of claim 10, wherein the frame includes the schedule identifying uplink and downlink transmission periods, the first node entering a low power state for a remainder of the frame sequence after the duration for the first node and the third node entering a low power state after the frame including the schedule and leaving the low power state before the uplink start time for the third node.

12. An apparatus comprising:
a controller configured to transmit, to at least a first node, a second node, and a third node, a frame including a schedule identifying uplink and downlink transmission periods, at least one downlink start time and duration for the first node, and at least one uplink start time and duration for the second node, during a frame sequence for at least the first node and the second node in a wireless network, all of the uplink transmissions being scheduled after all of the downlink transmissions within the frame sequence, with the first node having only scheduled downlink transmissions during the frame sequence;
wherein:
the scheduled downlink transmissions for the first node having only scheduled downlink transmissions are scheduled at or near a start of the downlink transmissions, the scheduled uplink transmissions for the second node having only scheduled uplink transmissions are scheduled at or near an end of the uplink transmissions, the third node having both downlink and uplink transmissions has its uplink start time and downlink start time scheduled for transmissions near a transition from downlink to uplink transmissions, and the frame comprises an IEEE 802.11n Power Save Multi Poll frame.

13. An article comprising:

a non-transitory computer-readable storage medium;

said non-transitory computer-readable storage medium including stored thereon instructions that, when executed by a processor, result in:

transmitting, to at least a first node, a second node, and a third node, a frame identifying uplink and downlink transmission periods, at least one downlink start time and duration for the first node, at least one downlink start time and duration for the second node, at least one uplink start time and duration for the second node, and at least one uplink start time and duration for the third node, for at least the first node, second node, and third node in a wireless network, all of the uplink transmissions being scheduled after all of the downlink transmissions, wherein:

the scheduled downlink transmissions for the first node having only scheduled downlink transmissions are scheduled at or near a start of the downlink transmissions, the second node having both downlink and uplink transmissions having its downlink start time and uplink start time for transmissions scheduled near the transition from downlink to uplink transmissions, the third node having only scheduled uplink transmissions has its uplink start time and downlink start time scheduled at or near an end of the uplink transmissions, and the frame comprises an IEEE 802.11n Power Save Multi Poll frame.

14. An apparatus comprising:

a controller configured to receive a frame from an access point and execute instructions included in the frame, the frame including a schedule identifying uplink and downlink transmission periods, at least one downlink start time and duration for a first node, at least one uplink start time and duration for a second node, at least one downlink start time and duration for a third node, at least one uplink start time and duration for the third node, during a frame sequence for at least the first node the second node, and the third node in a wireless network, all of the uplink transmissions being scheduled after all of the downlink transmissions within the frame sequence, with the first node having only scheduled downlink transmissions during the frame sequence; wherein:

the scheduled downlink transmissions for the first node having its downlink start time are scheduled at or near a start of the downlink transmissions, the scheduled uplink transmissions for the second node having only scheduled uplink transmissions are scheduled at or near an end of the uplink transmissions, the third node having both downlink and uplink transmissions has its uplink start time and downlink start time scheduled for transmissions near a transition from downlink to uplink transmissions, and the frame comprises an IEEE 802.11n Power Save Multi Poll frame.

15. An apparatus comprising:

a controller configured to receive a multicast frame including a schedule identifying uplink and downlink transmission periods, at least one downlink start time and duration for a first node, at least one downlink start time and duration for the apparatus, at least one uplink start time and duration for the apparatus, and at least one uplink start and duration for a second node, during a frame sequence for at least the first node, the apparatus, and the second node in a wireless network, all of the uplink transmissions being scheduled after all of the downlink transmissions within the frame sequence, wherein:

the scheduled downlink transmissions for the first node having only scheduled downlink transmissions are scheduled at or near a start of the downlink transmissions, the apparatus having scheduled both downlink and uplink transmissions during the frame sequence has its downlink start time and uplink start time for transmissions scheduled near a transition from downlink to uplink transmissions, the scheduled uplink transmissions for the second node having only scheduled uplink transmissions are scheduled at or near an end of the uplink transmissions, and the frame comprises an IEEE 802.11n Power Save Multi Poll frame.

16. An apparatus comprising:

a controller configured to receive a multicast frame including a schedule identifying uplink and downlink transmission periods, at least one downlink start time and duration for a first node, at least one uplink start time and duration for the apparatus, at least one downlink start time and duration for a second node, and at least one uplink start time and duration for the second node, during a frame sequence for at least the first node, the apparatus, and the second node in a wireless network, all of the uplink transmissions being scheduled after all of the downlink transmissions within the frame sequence, wherein:

the scheduled downlink transmissions for the first node having only scheduled downlink transmissions are scheduled at or near a start of the downlink transmissions, with the apparatus having only scheduled uplink transmissions during the frame sequence has its uplink transmissions scheduled at or near an end of the uplink transmissions, the second having scheduled both downlink and uplink transmissions during the frame sequence has its downlink start time and uplink start time for transmissions scheduled near a transition from downlink to uplink transmissions, and the frame comprises an IEEE 802.11n Power Save Multi Poll frame.

17. A method comprising:

receiving, by a second node from an apparatus, a frame including a schedule identifying uplink and downlink transmission periods, at least one downlink start time and duration for a first node, at least one downlink start time and duration for the second node, at least one uplink start time and duration for the second node, and at least one uplink start and duration for a third node, during a frame sequence for at least the first node, the second node, and the third node in a wireless network, all of the uplink transmissions being scheduled after all of the downlink transmissions within the frame sequence, wherein:
- the scheduled downlink transmissions for the first node having only scheduled downlink transmissions are scheduled at or near a start of the downlink transmissions,
- the second node having scheduled both downlink and uplink transmissions during the frame sequence having its downlink start time and uplink start time for transmissions scheduled near a transition from downlink to uplink transmissions,
- the scheduled uplink transmissions for the third node having only scheduled uplink transmissions are scheduled at or near an end of the uplink transmissions, and
- the frame comprises an IEEE 802.11n Power Save Multi Poll frame.

18. A method comprising:

receiving, by a second node from an apparatus, a frame including a schedule identifying uplink and downlink transmission periods, at least one downlink start time and duration for a first node, at least one uplink start time and duration for the second node, at least one downlink start time and duration for a third node, and at least one uplink start time and duration for the third node, during a frame sequence for at least the first node and the second node in a wireless network, all of the uplink transmissions being scheduled after all of the downlink transmissions within the frame sequence, wherein:
- the scheduled downlink transmissions for the first node having only scheduled downlink transmissions are scheduled at or near a start of the downlink transmissions,
- the second node having only scheduled uplink transmissions during the frame sequence has its uplink transmissions scheduled at or near an end of the uplink transmissions,
- the third node having scheduled both downlink and uplink transmissions during the frame sequence has its downlink start time and uplink start time for transmissions scheduled near a transition from downlink to uplink transmissions, and
- the frame comprises an IEEE 802.11n Power Save Multi Poll frame.

* * * * *

UNITED STATES PATENT AND TRADEMARK OFFICE
CERTIFICATE OF CORRECTION

| | | |
|---|---|---|
| PATENT NO. | : 7,873,018 B2 | |
| APPLICATION NO. | : 11/452082 | |
| DATED | : January 18, 2011 | |
| INVENTOR(S) | : Naveen K. Kakani | |

It is certified that error appears in the above-identified patent and that said Letters Patent is hereby corrected as shown below:

In column 17, line 50, in claim 14, delete "node" and insert -- node, --, therefor.

In column 18, line 10, in claim 15, after "start" insert -- time --.

In column 18, line 66, in claim 17, after "start" insert -- time --.

Signed and Sealed this
Twenty-second Day of March, 2011

David J. Kappos
*Director of the United States Patent and Trademark Office*